(12) United States Patent
Kassem et al.

(10) Patent No.: US 6,261,355 B1
(45) Date of Patent: Jul. 17, 2001

(54) BINDER ADJUVANT USED IN CONSTRUCTION AND MATERIAL COMPRISING IT

(75) Inventors: Nizar Al Kassem, 19, rue Farabi Autostrade; Haisan Al Rifai, both of Meeze Damas (SY)

(73) Assignees: Nizar Al Kassem, Mezze Damas (SY); Abdelmalek Louhibi, Nice (FR)

( * ) Notice: Subject to any disclaimer, the term of this patent is extended or adjusted under 35 U.S.C. 154(b) by 0 days.

(21) Appl. No.: 09/192,941

(22) Filed: Nov. 16, 1998

(30) Foreign Application Priority Data

Nov. 17, 1997 (FR) .................................................. 97 14352
Nov. 28, 1997 (FR) .................................................. 97 15038

(51) Int. Cl.$^7$ .......................... C09D 101/28; C09D 5/08; C09D 5/18; C04B 24/38
(52) U.S. Cl. ..................................... 106/172.1; 106/177.1; 106/197.1; 106/730; 106/780; 106/805; 106/14.11; 106/14.21; 106/18.11; 106/18.12; 106/823
(58) Field of Search ........................... 106/177.1, 197.01, 106/823, 172.1, 192.1, 730, 780, 805, 14.11, 14.21, 18.11, 18.12

(56) References Cited

U.S. PATENT DOCUMENTS 3,598,642 * 8/1971 Huang et al. .
5,424,099 * 6/1995 Stewart et al. .

FOREIGN PATENT DOCUMENTS 0 200 471 * 11/1986 (EP) .
0 375 332 * 6/1990 (EP) .
0 460 744 * 12/1991 (EP) .
WO 93/10054 * 5/1993 (WO) .

OTHER PUBLICATIONS

Yamagishi et al., "Cement Mortar Lining Mixtures For Metal Pipes", Chemical Abstracts, vol. 88, No. 18, May 1978, XP000059664.*
"Anhydrite Compositions for Slabs", Chemical Abstracts, vol. 100, No. 20, May 1984, XP000188899.*
"Inorganic Coating Composition", Chemical Abstracts, vol. 101, No. 20, Nov. 1984, XP000188744.*

* cited by examiner

*Primary Examiner*—David Brunsman
(74) *Attorney, Agent, or Firm*—Young & Thompson

(57) ABSTRACT

A binder adjuvant used in engineering includes in aqueous solution, a mixture of a water-soluble cellulose ether and of an antifoaming agent.

17 Claims, No Drawings

BINDER ADJUVANT USED IN CONSTRUCTION AND MATERIAL COMPRISING IT

BACKGROUND OF THE INVENTION

The invention relates to a binder adjuvant used in construction and engineering. The aim of this adjuvant is in particular, when it is applied with a binder to a surface of a component of a structure:

- to produce leaktightness to water, whether clean or otherwise, and to hydrocarbons;
- to produce good plugging of cracks;
- to produce a layer which replaces the mortar;
- to produce a coating prior to carrying out painting work on surfaces to be painted;
- to produce an exterior paint layer on coating surfaces;
- to produce perfect adhesive bonding and adhesion between the surface and the covering (marble, tiling, ceramic, brick, and the like);
- to produce a layer which is stable to fire and thus to ensure protection against fire;
- to produce a stiff and lasting layer which adheres to certain materials and in particular to cellular polystyrene surfaces;
- to produce, on a metal surface, an antirust insulating layer and, at the same time, to have an acceptable finish.

DESCRIPTION OF THE RELATED ART

Various methods are used to achieve leaktightness. However, the results obtained are not always satisfactory or lasting, in general. Furthermore, these methods are generally relatively expensive. Such methods for rendering leaktight often require a qualified workforce and generally a highly specific and special cement when the latter represents one of the constituents of the insulating material.

The plugging of cracks is not always carried out efficiently according to the materials used; furthermore, the plugging is generally expensive to carry out.

It is essential in engineering to prepare several consecutive layers of mortar on surfaces, in order to carry out other work, such as that necessary before coating layers are prepared, which requires not insignificant work and time.

It is essential in engineering to prepare coating layers on surfaces, in order to carry out other work, such as painting. However, this requires a relatively large amount of work, the coating layer being characterized by its brittleness and exhibiting certain difficulties relating to smoothing.

When exterior painting is carried out, a layer is produced which sometimes exhibits certain disadvantages, such as weak durability, permeability, weak resistance to ultraviolet rays and soiling by pollution.

The preparation of a layer for the adhesive bonding of coverings (marble, tiling, ceramic, brick, and the like) requires cement adhesive, which is relatively expensive and which is not always available in certain Third World countries.

The preparation of a layer which is stable to fire requires a relatively expensive substance which is not always available in certain Third World countries.

The preparation of polystyrene panels requires a covering, given the brittleness of this substance. The coverings used do not generally give the characteristics of durability, of leaktightness and of resistance to fire simultaneously.

The preparation of an antirust layer on a metal surface requires a relatively expensive substance which is not always available in certain Third World countries.

SUMMARY OF THE INVENTION

The adjuvant according to the invention, when it is combined with a binder, and which is subsequently known as "substance", solves the problems set out above and provides the following advantages.

The substance makes it possible to obtain complete and lasting leaktightness to water, whether clean or otherwise, and to hydrocarbons, in contrast to that obtained with the existing methods. This substance is more cost-effective and easier to prepare. It can comprise an immense range of products and in particular an immense range of cement powder.

The substance makes it possible to obtain lasting and cost-effective plugging.

The substance makes it possible to obtain a layer which replaces the mortar. This layer is very easy to prepare, given that it is very easy to handle.

The substance makes it possible to obtain a coating prior to carrying out painting work on surfaces to be painted. This coating is more cost-effective and easier to prepare. The smoothing is very easy to carry out. Furthermore, the coating is hard after drying, in contrast to conventional coatings, which are very brittle.

The substance makes it possible to obtain an exterior paint layer which is impermeable, lasting, resistant to ultraviolet rays and easy to clean and to maintain.

The substance makes it possible to obtain very good adhesive bonding and perfect adhesion between the surface and the covering (marble, tiling, ceramic, brick, and the like). This substance is more cost-effective than conventional cement adhesives.

The substance makes it possible to obtain a layer which is stable to fire and thus to provide protection against fire. This substance is more cost-effective and the constituents are generally more readily available commercially than the other substances, in particular in Third World countries.

The substance makes it possible to obtain, on the surface of a cellular polystyrene panel, a covering which is simultaneously lasting, leaktight and resistant to fire.

The substance used makes it possible to obtain an antirust insulating layer on a metal surface, and simultaneously to have an acceptable finish, which is cost-effective.

The invention is also highly effective in rendering leaktight a mortar layer, a coating layer, a paint layer, an adhesive layer or a protective layer on cellular polystyrene.

Three or four of these objectives are often required simultaneously and they are thus achieved with the same substance, which multiplies the savings achieved; in addition, it is possible to obtain protection against rust and fire.

The substance which is the subject-matter of our invention is composed of a mixture which, mixed with products and in particular cement powder, allows us to obtain the layer which provides the leaktightness, which replaces the mortar and which provides the coating, the painting, the adhesive bonding and the insulation against fire and rust.

This mixture is formed of four constituents:

Drinking water is mixed with Tylose H 10000 (viscosity) powder formed of hydroxyethylcellulose from the Hoechst plant of German origin or of its functional equivalent; this mixture is mixed with an antifoaming liquid, Foamex DKC of Info-Tan trademark, sold by Nueva Tanex S.A. in Spain, or its functional equivalent; titanium dioxide, as colorant, in order to provide an offwhite colour, or another colorant product, depending on the colour desired, is optionally added to the product thus obtained, Furthermore, a subject-matter of the invention is a binder adjuvant used in construction, characterized in that it comprises, in aqueous solution, a mixture of a water-soluble cellulose ether and of an antifoaming agent.

DESCRIPTION OF THE PREFERRED EMBODIMENTS

According to specific embodiments, the adjuvant comprises one or more of the following characteristics:

the water-soluble cellulose ether comprises hydroxyethylcellulose;

the antifoaming agent is a silicone;

it comprises 1 to 50 g of hydroxyethylcellulose per liter of water and preferably 18 gl of water; and it additionally comprises a colorant.

Another subject-matter of the invention is the use of the adjuvant, mixed with a binder, in order to obtain one or more of the characteristics from leaktightness, the prevention of rust on a metal surface, the preparation of a fire screen, the preparation of a mortar, the preparation of a coating, the preparation of a paint layer, the achievement of adhesive bonding or the preparation of a covering which can be applied to polystyrene.

In addition, a subject-matter of the invention is a construction material, characterized in that it comprises an adjuvant as described above and a binder from cement, mortar, plaster, coating, adhesive and paint.

For the preparation of the adjuvant, one liter of drinking water can be mixed with an amount of 1 to 50 grams and preferably 18 grams of Tylose H 10000 (viscosity) powder using a mixer for three minutes; the mixing must be carried out directly during the addition of the powder with the water.

An amount of 10 to 1000 $cm^3$ and preferably 100 $cm^3$ of the antifoaming liquid Foamex DKC can be added to this mixture and mixing can be carried out for three minutes, which makes it possible to obtain the desired product, constituting the adjuvant according to the invention.

It is possible to add to this product, if it is desired to give it an offwhite colour, a mixture formed of water and titanium dioxide in the proportions of 50 $cm^3$ of water per 3 grams of titanium dioxide. The latter two constituents are mixed for 3 minutes and form a liquid which is offwhite in colour. This liquid is mixed in its turn with the product mentioned for 3 minutes.

However, the addition of a colorant is optional.

In order to obtain a cement having the properties indicated above, 10 to 1000 $cm^3$ and preferably 60 $cm^3$ of the product finally obtained can be mixed with 100 grams of cement powder, for example, at the time of carrying out the work.

The adjuvant according to the invention can be obtained from an antifoaming agent, such as Foamex DKC, mixed with various types of water-soluble cellulose ethers, such as methylcellulose (MC), methylhydroxyethylcellulose (MHEC), methylhydroxypropylcellulose (MHPC), hydroxyethylcellulose (HEC), sodium carboxymethylcellulose (NaCMC) and sodium carboxymethylhydroxyethylcellulose (NaCMHEC).

The antifoaming agent employed here is Foamex DKC. This agent is based on silicone and additionally comprises sodium o-phenylphenate tetrahydrate. The invention can also be employed with Burst 100, sold by the company Allied Colloids in England.

Advantageously, hydroxyethylcellulose (HEC) is used in the adjuvant mixed with Foamex as antifoaming agent.

The adjuvant according to the invention was tested in order to evaluate its leaktightness properties with respect to water.

The test carried out was carried out on a machine of German origin known under the name of "Strassentest", which is adjusted to measure the permeability to water according to German Standard DIN 1048, first part.

The test was carried out on three identical samples, each formed of a concrete prism. Two prisms were covered on one test face with a covering based on cement incorporating the binder according to the invention. The composition of the covering was as follows: 60 $cm^3$ of adjuvant per 100 g of Portland cement.

By way of comparison, the third sample was covered on one test face with a covering of "Erto-Flex" sold by the company Lafarge in France.

The coverings of the three samples were formed by three leaktightness layers of the same nature, each with a thickness of one millimeter, put in place successively at intervals of 24 hours.

The test was carried out 14 hours after the application of the final layer. The test consisted in applying, to each leaktightness layer, a pressure of 8.5 bar. This water pressure was applied from the bottom upwards. It was maintained for 4 hours.

At the end of the 4 hours, the three samples were split longitudinally, in order to measure the depth of penetration of the water.

In the reference sample, comprising an "Erto-Flex" covering, it is found that the water has passed through the 3 mm of the leaktightness layer. However, the concrete constituting the prism was not significantly wetted.

In the two samples comprising a covering based on the binder according to the invention, it is found that the water has penetrated into the covering only over a thickness of a quarter of a millimeter to half a millimeter, over the total thickness of 3 mm of the covering.

It would thus be proper to conclude that, with the covering using the binder according to the invention, the penetration of water is greatly reduced, which guarantees good leaktightness. Furthermore, given the low duration of drying between the application of the final layer and the beginning of the test (only 14 hours), the water revealed in the surface layer of the covering could be explained by insufficient drying of this surface layer, rather than by true penetration of pressurized water.

Various uses and implementations of the adjuvant will now be described.

To produce leaktightness:

This product can be applied to surfaces, for example made of concrete, mortar, cement, masonry or brick, as follows:

1 Scrub the surface using a metal brush in order to thoroughly clean it;

2 Wash the surface with drinking water;

3 Spread the substance over the surface using a brush;

4 Spread the substance a second time with a coating knife in order to obtain a second layer with a thickness of approximately 1 mm after 12 h;

5 Repeat the above process (4) after 12 h; and

6 Sprinkle the surface with drinking water every 24 h for three days.

This substance can be applied both on the outside of the surface to be isolated from where the water originates (active pressure) and on the inside of this surface (passive pressure or counterpressure).

To carry out plugging of cracks:
1 Prepare the crack according to conventional methods;
2 Spread the substance inside the crack; and
3 Sprinkle the surface with drinking water every 24 hours for three days.

To prepare the mortar layer:
1 Scrub the surface using a metal brush in order to thoroughly clean it;
2 Wash the surface with drinking water;
3 Spread the substance over the surface using a brush;
4 Spread the substance a second time with a coating knife in order to obtain a second layer with a thickness of approximately 1 mm;
5 Repeat the above process after 12 h; and
6 Sprinkle the surface with drinking water every 24 h for three days.

To prepare the coating:
This product can be applied to surfaces, for example made of concrete, mortar, cement, masonry or brick, as follows:
1 Scrub the surface using a metal brush in order to thoroughly clean it;
2 Wash the surface with drinking water;
3 Spread the substance over the surface using a brush;
4 Spread the substance a second time with a coating knife in order to obtain a second layer with a thickness of approximately 1 mm after 12 h;
5 Smooth the layer obtained;
6 Sprinkle the surface with drinking water every 24 hours for three days; and
7 Paint the surface under consideration.

To carry out the exterior painting
This product can be applied to surfaces, for example made of concrete, mortar, cement, masonry or brick, as follows:
1 Scrub the surface using a metal brush in order to thoroughly clean it;
2 Wash the surface with drinking water;
3 Spread 2 consecutive layers of the substance with an interval of 12 h; and
4 Sprinkle the surface with drinking water every 24 h for three days.

To carry out adhesive bonding:
This product can be applied to surfaces, for example made of concrete, mortar, cement, masonry or brick, as follows:
1 Scrub the surface using a metal brush in order to thoroughly clean it;
2 Wash the surface with drinking water;
3 Clean with water the face to be adhesively bonded of the ceramic tiles;
4 Spread the substance over the surface with a serrated spreader in order to obtain a layer with a thickness of approximately 3 mm;
5 Apply adhesive to the ceramic tiles;
6 Place the ceramic tiles on the surface under consideration; and
7 Sprinkle the surface with drinking water every 24 h for three days.

To achieve protection against fire:
This product can be applied to surfaces, for example made of concrete, mortar, cement, masonry or brick, as follows:
1 Scrub the surface using a metal brush in order to thoroughly clean it;
2 Wash the surface with drinking water;
3 Spread the substance over the surface using a brush;
4 Spread the substance a second time with a coating knife in order to obtain a second layer with a thickness of approximately 1 mm after 24 h;
5 Repeat the above process after 12 h; and
6 Sprinkle the surface with drinking water every 24 h for three days.

To prepare the covering layer on the cellular polystyrene:
This product can be applied to cellular polystyrene panels as follows:
1 Wash the surface of the panels with drinking water;
2 Spread the substance with a coating knife in order to obtain a layer with a thickness of approximately 1 mm;
3 Place a mesh made of synthetic fibre over the surface;
4 Spread the substance a second time with a coating knife in order to obtain a second layer with a thickness of approximately 1 mm after 24 h; and
5 Sprinkle the surface with drinking water every 24 h for three days.

To achieve insulation against rust:
This product can be applied to metal surfaces as follows:
1 Clean the metal surface;
2 Spread two consecutive layers of the substance with an interval of 12 h.

What is claimed is:
1. Binder product used in construction, comprising:
a binder,
a binder adjuvant, comprising, in aqueous solution, a mixture of hydroxyethyl cellulose and of an antifoaming agent,
the final concentration of the hydroxyethyl cellulose in the binder product being from 1 to 50 grams per liter of water.
2. Binder according to claim 1, wherein the hydroxyethyl cellulose concentration is about 18 grams per liter of water.
3. Binder according to claim 1, wherein the antifoaming agent is a silicone.
4. Binder according to claim 1, further comprising a colorant.
5. A method for preparing a binder comprising the step of:
adding to a dry binder an adjuvant,
wherein the adjuvant comprises, in aqueous solution, a mixture of hydroxyethyl cellulose and of an antifoaming agent,
the hydroxyethyl cellulose concentration in the final binder being from 1 to 50 grams per liter of water.
6. Method according to claim 5, wherein the hydroxyethyl cellulose concentration is about 18 grams per liter of water.
7. Method according to claim 5, wherein the antifoaming agent is a silicone.
8. Method according to claim 5, wherein the adjuvant additionally comprises a colorant.
9. Method according to claim 5, wherein the binder is a binder selected from the group consisting of a cement, a mortar, a plaster and a coating.
10. A method for providing leaktightness of a binder, comprising the step of:

adding to a dry binder an adjuvant comprising, in aqueous solution, a mixture of hydroxyethyl cellulose and of an antifoaming agent, the hydroxyethyl cellulose concentration being from 1 to 50 grams per liter of water in the final binder.

11. Method according to claim 10, wherein the hydroxyethyl cellulose concentration is about 18 grams per liter of water.

12. Method according to claim 10, wherein the antifoaming agent is a silicone.

13. Method according to claim 10, wherein the adjuvant additionally comprises a colorant.

14. Method according to claim 10, wherein the binder is a binder selected from the group consisting of a cement, a mortar, a plaster and a coating.

15. A method for prevention of rust on a metal surface comprising the steps of:

adding to a binder an adjuvant comprising, in aqueous solution, a mixture of hydroxyethyl cellulose and of an antifoaming agent, the hydroxyethyl cellulose concentration in the final binder being from 1 to 50 grams per liter of water, and coating the metal surface with the adjuvanted binder.

16. A method for preparation of a fire screen from an adjuvanted binder, comprising the step of obtaining an adjuvanted binder by adding to a binder an adjuvant comprising, in aqueous solution, a mixture of hydroxyethyl cellulose and of an antifoaming agent, the hydroxyethyl cellulose concentration being from 1 to 50 grams per liter of water in the final binder.

17. A method for achieving an adhesive bonding from an adjuvanted binder, comprising the step of obtaining an adjuvanted binder by adding to a binder an adjuvant comprising, in aqueous solution, a mixture of hydroxyethyl cellulose and of an antifoaming agent, the hydroxyethyl cellulose concentration being from 1 to 50 grams per liter of water in the final binder.

* * * * *

UNITED STATES PATENT AND TRADEMARK OFFICE
CERTIFICATE OF CORRECTION

PATENT NO. : 6,261,355 B1                                                    Page 1 of 1
DATED : July 17, 2001
INVENTOR(S) : Nizar Al Kassem et al.

It is certified that error appears in the above-identified patent and that said Letters Patent is hereby corrected as shown below:

Title page,
Item [12], "Kassem et al." should be -- Al Kassem et al. --.

Signed and Sealed this

Twelfth Day of March, 2002

Attest:

Attesting Officer

JAMES E. ROGAN
*Director of the United States Patent and Trademark Office*